Dec. 19, 1939.  J. SWANBERG  2,183,849
BAIT
Filed May 2, 1938
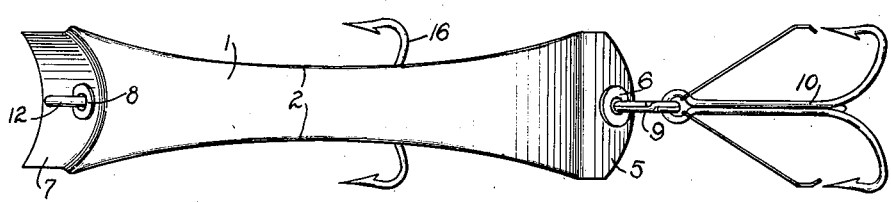
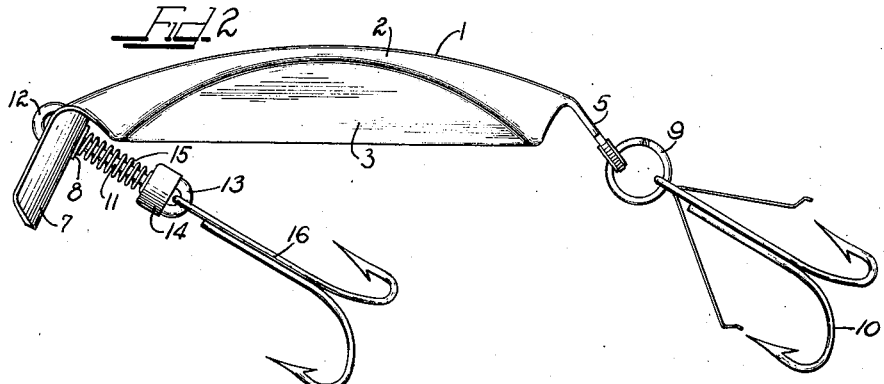
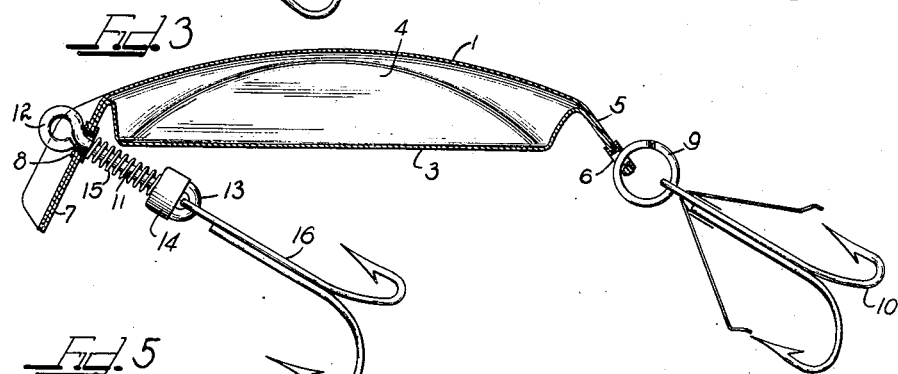
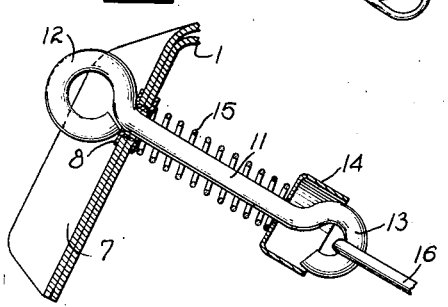
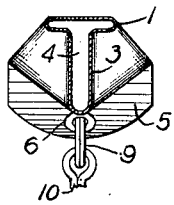
Inventor
JULIUS SWANBERG Patented Dec. 19, 1939

2,183,849

UNITED STATES PATENT OFFICE 2,183,849

BAIT

Julius Swanberg, Chicago, Ill.

Application May 2, 1938, Serial No. 205,475

9 Claims. (Cl. 43—42)

The present invention pertains to an improved type of fish bait or plug lure constructed entirely of metal tubing pressed and formed into shape and finished with a shiny surface with dashes of brilliant color to form an alluring fish attraction, said improved bait deviating from the spoon or spinner type and so shaped that the bait when in water always stays upright and is capable of being moved with a wonderful natural swimming action having no tendency to twist the line.

It is an object of this invention to provide an improved type of fish bait in the form of a metal plug lure constructed from tubular material so pressed and formed that the main body section of the bait is provided with head and tail sections on opposite ends of a closed chambered body formed with a keel portion.

It is also an object of this invention to provide a metal fish bait embracing a chambered body section having head, tail, and keel members forming integral parts thereof and having treble hooks connected to the head and tail portions, with the treble hook associated with the head portion being removably supported in position by an improved spring controlled connector permitting quick hook removal for fishing in weeds or where the law only permits three point hook fishing.

Still another object of the invention is the provision of a metal bait of a completely closed chambered construction and having a hook supporting connector mounted on the head plate or diving plane and including a spring latch construction facilitating rapid mounting or removal of hooks.

It is a further object of this invention to provide a metal fish bait constructed of tubular material and formed with a keel section for always keeping the bait in an upright position when in the water.

It is furthermore an object of this invention to provide a metal fish bait including a hollow keeled body, the head end of which carries a hook support having a spring controlled latch movable to facilitate rapid mounting of a hook on the hook support or removal of the hook from the support.

Still another object of the invention is the provision of a metal fish bait including a hollow keeled body section having an integral head plate or diving plane supporting a hook attachment including a spring controlled latch member associated with a hook supporting eye end piece to facilitate quick removal of a hook from the attachment or quick mounting of a hook by simply moving the spring controlled latch during the operation.

Still another object of the invention is the equipping of a fish bait with a hook attachment embodying a double eye shank having the open ends of the eye members disposed on the same side of the shank to permit quick and easy mounting of a hook on one of the eye members or removal of a hook by the movement of a spring controlled latch longitudinally on the shank out of engagement with the hook supporting eye member.

It is an important object of this invention to provide a metal fish bait constructed of metal tubing pressed and formed to provide a hollow body formed with a keel and with a tailpiece and a head plate, said head plate having a spring controlled line and hook attachment slidably projecting therethrough with the ends of the slidable attachment having eyes or loops, the ends of which face in the same direction, to facilitate quick mounting or removal of hooks from one end of the attachment with the shifting of a latch cover member.

Other and further important objects of this invention will be apparent from the disclosures in the specification and the accompanying drawing.

On the drawing:

Figure 1 is a top plan view of an improved metal bait embodying the principles of this invention.

Figure 2 is a side elevation of the bait and showing a side view of the improved spring controlled line attachment with a quick hook support.

Figure 3 is a longitudinal central section through the bait showing the hooks and hook attachments in elevation.

Figure 4 is a transverse detail section through the bait looking toward the tail end with the lower portion of the hook member broken away.

Figure 5 is an enlarged detail section through the head plate of the bait showing the improved line and hook attachment unit with parts sectioned.

As shown on the drawing:

The present invention is directed to an improved type of fish bait or plug lure preferably made entirely of metal tubing permitting the finished bait to be brightly plated producing a shiny surface touched up with dashes of brilliant color to provide an alluring fish attraction. Practically all of the present metal types of bait are of the spoon or spinner type, while this invention is directed to a metal bait preferably constructed of tubular metal so shaped and formed that the bait, when in use, adapts itself to a wonderful, natural swimming action with the bait always staying upright in water due to a keel feature tending to obviate line twisting. The improved bait is furthermore equipped with improved attachments readily adaptable to facilitate quick mounting of hooks on the bait or removal of the hooks.

The improved bait or plug lure is preferably constructed of metal tubing, a section of the required length being compressed and formed to form a metal bait comprising a curved or arched hollow body section 1 formed with concave sides 2, so that, as clearly illustrated in Figure 1, the end portions of the body 1 are wider than the restricted middle portion to give the bait body a streamline shape. The side portions of the tubular body material are pressed inwardly so that the lower portion of the bait is shaped in the form of a keel 3, the bottom of which is straight, as illustrated in Figure 2, while the ends of the keel terminate at the wide end portions of the body. Both the body and the keel thereof are hollow or chambered as at 4. One end of the body portion of the bait forming tube is pinched together and bent downwardly away from the top convex surface of the bait to form a tail piece 5, the end seam of which is closed by solder or plating material. The tail piece 5 is provided with an opening through which an eyelet 6 is engaged to seal the opening to insure against leakage of water between the tail piece plates and into the chamber 4 of the bait.

The opposite end of the bait forming metal tube is also pinched together to form a head plate or diving plane 7 which is partly rounded or concave throughout its length and extends downwardly in an inclined plane from the end of the bait body section. The outer or lower ends of the plates forming the head plate 7 are soldered or plated to close the same to insure against leakage of water between the plates into the chamber 4 of the bait. The scoop-shaped head plate 7 is provided with an opening in which an eyelet 8 is engaged to insure against the leakage of water into the interior of the metal bait.

The entire one-piece metal bait is smoothly finished and provided with a plated finish producing a shiny, attractive surface. Portions of the outer surface of the bait, such for example as the under surfaces of the tail piece 5 and the head plate 7 may be coated with brilliant colors to produce a finished bait or plug lure providing an alluring fish attraction. The bottom keel 3 of the bait body unit has the effect of maintaining the bait in an upright position when in water and obviates any tendency of the twisting of the line to which the bait is connected. The degree of inclination of the tail piece controls the wiggle, while the angle of inclination of the head plate or diving plane 7 controls the depth of travel of the bait.

Engaged through the eyelet 6 in the tail piece 5 is a hook ring 9 in which a weedless treble hook 10 is engaged. It will, of course, be understood that, if desired, a single or double type weedless hook may be attached to the ring 9 or any other type of hook which may be selected.

Mounted through the eyelet 8 of the head plate 7 is an improved combination spring controlled line and hook attachment unit which is slidably or shiftably supported in the head plate. The combination attachment unit comprises a double eye member consisting of a shank or stem 11 which slidably projects through the eyelet 8 as clearly illustrated in Figure 5. Integrally formed on one end of the shank 11 is a line or leader attachment eye or loop 12 which normally is seated in the concave front side of the head plate 7. Integrally formed on the opposite end of the shank 11 is a hook attachment eye or open hook-shaped loop 13. The two eye members 12 and 13 are so formed and positioned that the open ends thereof are disposed adjacent the same side of the shank 11 or face in substantially the same direction to facilitate convenient removal of a hook from the unit as hereinafter more fully described. Slidably engaged on the shank 11 is a cup or cap shaped latch 14, the open end of which is directed toward the hook supporting eye 13 and normally is resiliently held in latched position seated over the open end of the eye 13 by means of a coiled control spring 15 engaged around the shank 11 between the cap latch 14 and the under side of the head plate 7. The spring 15 not only holds the latch cap in position over the hook eye 13 but also serves to hold the line attachment eye 12 seated against the concave surface of the head plate 7. Removably hung on the hook eye or loop 13 is a treble hook 16 or any other suitable type of hook which may be selected. By simply pushing the latch cap 14 toward the head plate 7 and compressing the spring 15, the loop supporting end of the treble hook 16 may be readily engaged over the hook end of the eye 13 after which the latch cap is released permitting the compressed spring 15 to slide the cap outwardly into latching position to cover the open end of the eye 13, as clearly illustrated in Figure 5. To remove the hook 16, it is only necessary to push the latch cap 14 away from the member 13 thereby permitting the loop supporting end of the hook 16 to be removed from the eye 13. The mounting or removal of a hook from the hook supporting eye 13 is greatly facilitated due to the fact that the open ends of the eyes 12 and 13 are directed in substantially the same direction, that is, toward one side of the shank 11 so that when the latch cap 14 is engaged over the open end of the hook supporting eye 13, a person desiring to remove a hook from the eye 13 or place a hook thereon can tell by the open end of the line attachment eye 12 on which side to expect the opening in the hook supporting eye 13 before the latch cap 14 is moved away from the eye 13.

Attention is also directed to the improved combination line and hook attachment unit in that the unit is spring controlled and is slidably engaged through the eyelet 8 in the head plate 7 affording a shock absorbing attachment adapted to function when the bait is drawn through the water by means of a line attached to the eye 12 when a strike is made on the tail hook 10 causing a rearward pull on the bait body and a subsequent movement of the head plate 7 and the shank 11 to produce compression of the control spring 15 so that the line attached to the eye 12 is relieved from the shock strains resulting from the strike.

While an improved quick hook release type unit has been illustrated and described as being connected with the head plate or diving plane 7 of the bait, it will, of course, be understood that a quick release hook attachment may also be connected to the tail piece 5 by engaging the eye 1_ of the combination attachment directly through the eyelet 6 of the tail piece. If preferred, however, the eye 12 of the line attachment may be engaged in a ring member 9 supported on the tail piece 5.

The improved combination line and hook attachment unit facilitates quick hook removal of the head hook 16 for fishing in weeds or in localities where the law only permits fishing with a single treble hook.

The improved metal bait may be constructed of different kinds of metal for adapting the bait for different kinds of fishing. The bait may be constructed out of brass to provide a sinking bait, out of aluminum to produce a floating bait or a fly rod bait, or, if preferred, the bait may be constructed of stainless steel for salt water fishing.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. A fish bait comprising a one-piece metal body section having a watertight air chamber therein and formed with an integral tail piece and an integral head plate on the ends thereof and with a watertight air chambered keel longitudinally on the bottom of the body section.

2. A fish bait including in combination a body section constructed of a single piece of metal tubing compressed and shaped to form a watertight air chambered intermediate section with the bottom portion formed to provide a hollow keel closed by the body section, a flat inclined tail piece on one end of the intermediate body section, and a concave inclined head piece formed on the opposite end of the intermediate body section said tail piece and head piece closing the ends of the intermediate section.

3. A fish bait comprising a body section of arched construction narrowed at the middle portion and widening toward both ends, a keel on the bottom of the body portion and closed thereby, a tail piece integrally formed on one end of the body portion, and a head plate integrally formed on the opposite end of the body portion.

4. A fish bait comprising a hollow watertight body section of arched construction transversely narrowed at the middle portion and widening toward both ends, a hollow keel on the bottom of the body portion and having the hollow portion thereof communicating with the hollow portion of the body section, a flat tail piece integrally formed on one end of the body portion closing one end of the same and inclined downwardly and outwardly therefrom, and a concave head piece integrally formed on the opposite end of the body portion and closing the opposite end thereof and inclined downwardly and outwardly therefrom.

5. A bait constructed of a single piece of tubular material compressed and shaped to form a sealed air chambered body section of arched construction narrowed at the middle portion and widening toward both ends, a flattened hollow keel the top of which is curved to integrally merge with the arched bottom of the body section and having the interior thereof communicating with the interior of the body section, a downwardly and outwardly inclined tail piece integrally formed on one end of the body section, and a downwardly and outwardly inclined head piece integrally formed on the opposite end of the body section.

6. A fish bait constructed of a single piece of metal tubing compressed and shaped to form an arched hollow body section of narrowest width and least thickness at the middle and increasing equally in width and thickness toward both ends, the ends of said body section being pinched together to form downwardly and outwardly inclined hook attachment end pieces, said tubing having a portion thereof intermediate the ends of the body section compressed to form a hollow centrally aligned longitudinal keel.

7. A fish bait constructed of a single piece of metal tubing compressed and shaped to form an arched and closed hollow body section narrowed at the middle portion and widening toward both ends, and a hollow keel shaped to converge into the bottom of the body portion and closed thereby.

8. A fish bait constructed of hollow metal tubing compressed and shaped to form an arched body section of least width and depth and narrowed at the middle and widening and increasing in depth toward both ends, and a longitudinally disposed keel having the upper portion curved to merge with the bottom of the body section and having a straight bottom terminating at the ends of the body section.

9. A fish bait comprising an arched hollow body section narrowest at the middle and widening equally and uniformly toward both ends, and end pieces integrally formed on the ends of the body section and inclined with respect thereto and with respect to one another.

JULIUS SWANBERG.